United States Patent Office 2,996,700
Patented Aug. 15, 1961

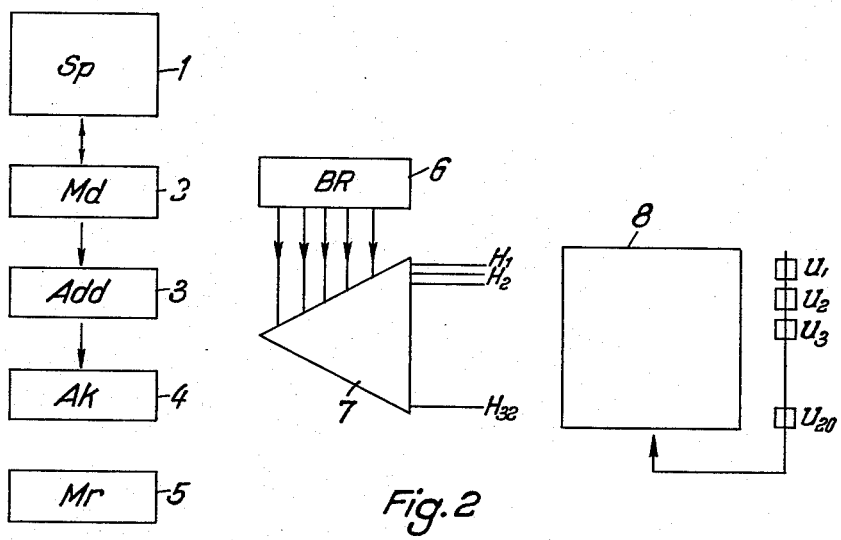
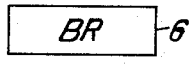
Fig. 1
Fig. 2
Fig. 3

2,996,700
ARRANGEMENT FOR CONTROLLING IN CALCULATING MACHINES, OFFICE MACHINES AND THE LIKE
Heinz Billing and Wilhelm Hopmann, Gottingen, Germany, assignors to Max-Planck-Gesellschaft zur Förderung der Wissenschaften e.V., Gottingen, Germany
Filed Nov. 29, 1955, Ser. No. 549,816
Claims priority, application Germany Nov. 29, 1954
4 Claims. (Cl. 340—174)

This invention relates to electronic computing, calculating, and similar machines, and more particularly to an improvement of their control organisms.

Such a machine comprises, in addition to storage units and calculating or computing units proper, a command organism which controls the succession of the several operations. This command center includes a command register into which are fed the various commands as may be required for a desired result in the shape of command keys, and also includes control arrangements which, dependent upon the command fed to the command center, control the other parts of the machine. The various control arrangements constitute the control organism or center and the invention relates more particularly to an improvement of this control.

The purpose of the invention will now be explained referring by way of example to a machine of the parallel operation kind. However, similar arrangements could be used in conjunction with series machines.

The problem to be solved and the fundamental operating principles will now be described with reference to FIGS. 1, 2 and 3 of the accompanying drawings, FIGS. 4 to 11 showing various embodiments of the invention.

FIG. 1 shows diagrammatically the combination and association of the various parts of a calculating machine;

FIG. 2 shows the interconnection between a command register and a control center of the machine;

FIG. 3 shows such a control arrangement of conventional design;

Figure 4:
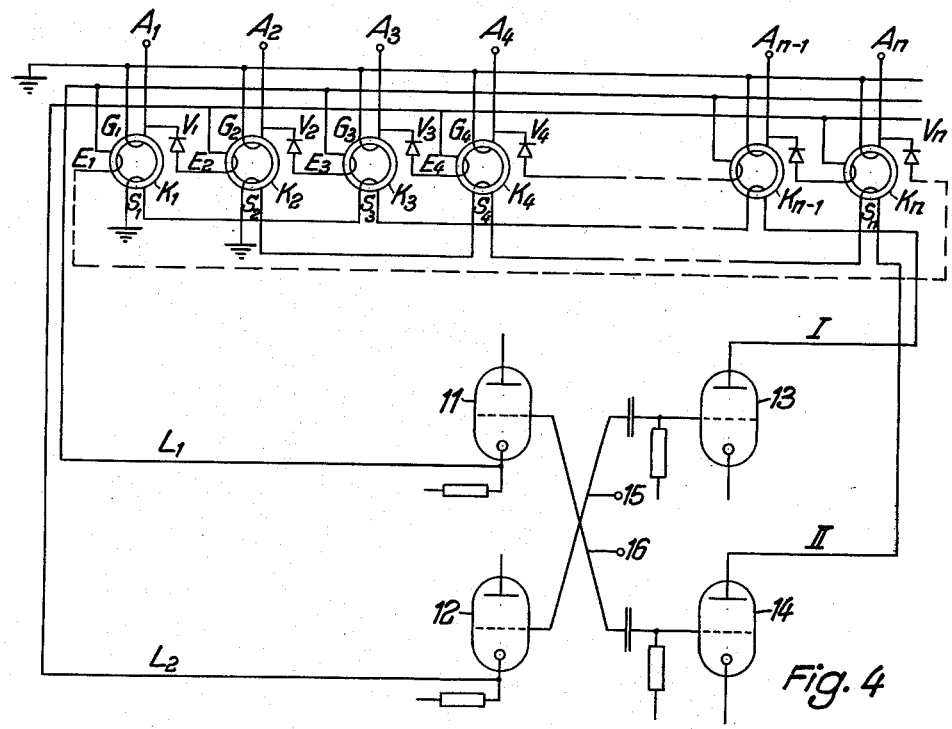
FIG. 4 is the diagram of an electronic control arrangement according to the invention.
Figure 5:
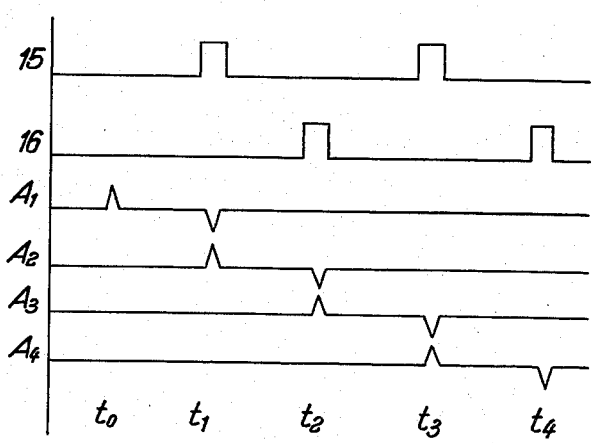
Figure 6:
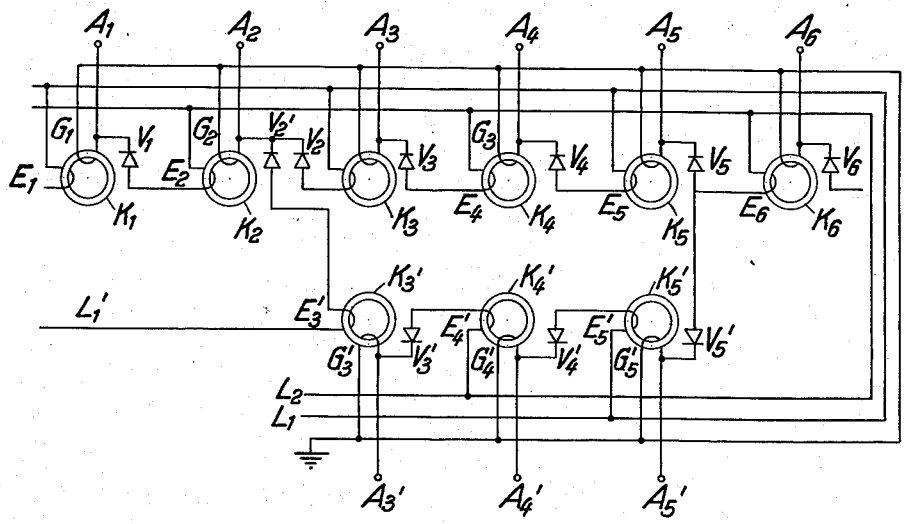
Figure 7:
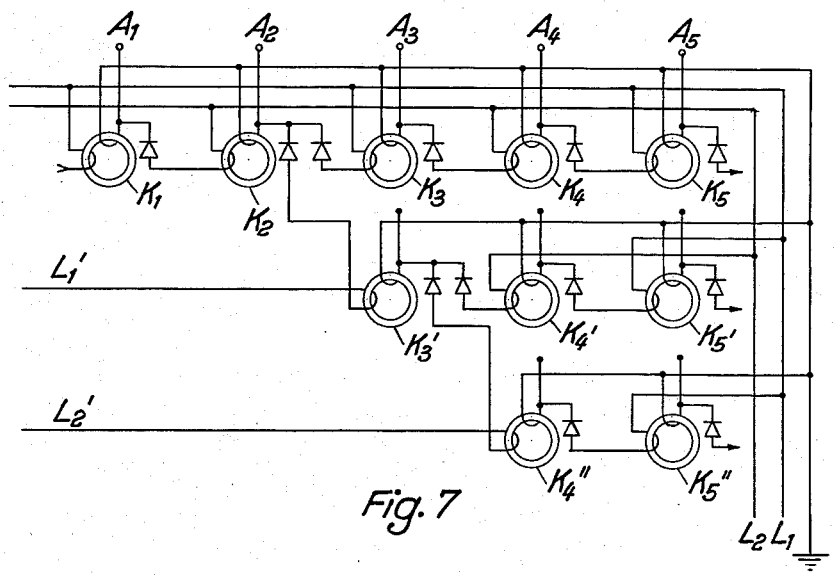
Figure 8:
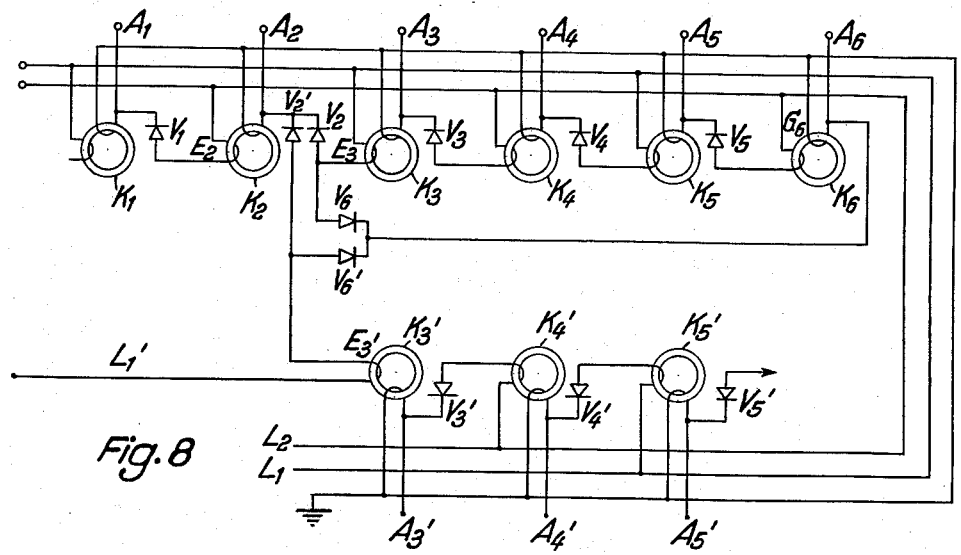
Figure 9:
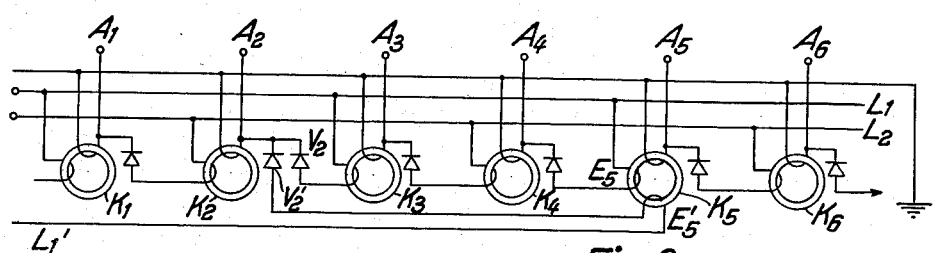
Figure 10:
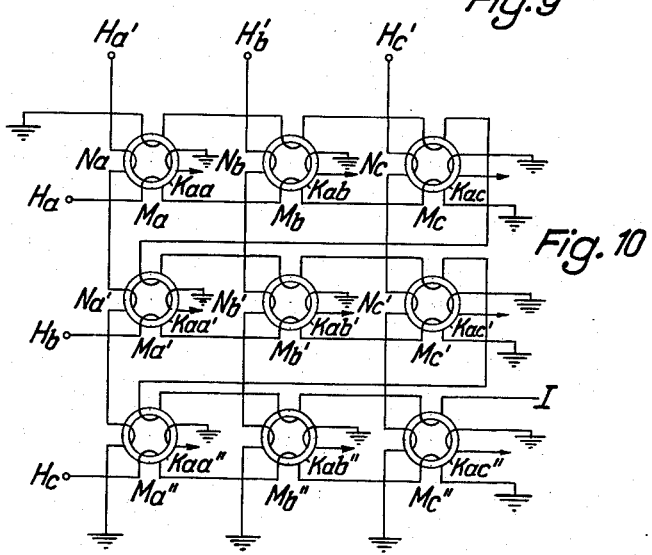
Figure 11:
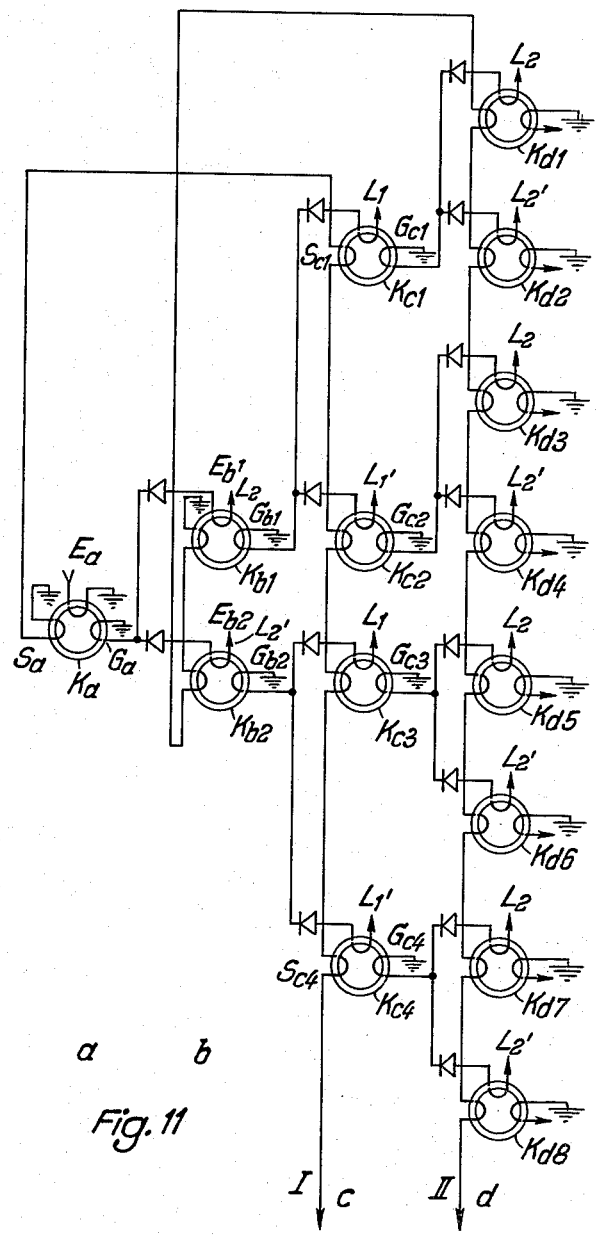

FIG. 5 comprises curves showing how the potentials at certain points of FIG. 4 vary with time;

FIG. 6 is a diagram of a control including a branched chain arrangement;

FIG. 7 shows a further development including several branches;

FIG. 8 shows a ring chain arrangement;

FIG. 9 shows another embodiment in which certain portions of the chain can be omitted by skipping;

FIG. 10 shows a matrix suitable for controlling the first elements of a control chain; and FIG. 11 shows the connection diagram for a deciphering unit suitable for operating the control chains.

The arrangement of FIG. 1 includes a storage unit 1 and a calculating unit with three readily accessible registers, namely a multiplicand register 2 which is also indicated $Md$, a multiplier register 5 also indicated $Mr$, and an accumulator 4 also indicated $Ak$. A command register 6 indicated $Br$, and an adding device 3 indicated $Ad$ are also provided.

The register 2 connected to the storage unit 1 is supplied with the multiplicand, and the register 5 is supplied with the multiplier if a multiplication is to be carried out. Between the $Md$ register 2 and the accumulator there is an adding device 3 so that the contents of $Md$ can be added to the accumulator as required, and the results of the various calculating operations appear in the accumulator.

The command register 6 is supplied with the various calculation commands before the start of each calculating operation. Each command comprises an address portion constituted by the number of the storage unit, the contents of which is used for the calculating operation, and an operating portion which determines the kind of the calculating operation required. For instance a command $LSp$ means "read the storing unit" or in other words transfer the contents of the storage unit indicated in the command register to the $Md$ register. All the registers are so interconnected that the contents of one register can be transferred to any of the other registers if a suitable command is given. For instance, the command "$Md \rightarrow Mr$" means "shift the contents from $Md$ to $Mr$." Furthermore, the digits of a number within each register can be shifted to the left or to the right by a respective command. Such command may be $Md \rightarrow 1$ or $Mr \rightarrow r$, for instance. All the various calculating operations such as multiplication, division, square roots and so on, can be obtained by combining such sub-commands including addition, transfer, shifting, and other simple operations. The main command defines the actual calculation and is composed of a number of sub-commands.

For a better understanding two simple examples will now be described.

1st main command

Transfer a number from the storage unit designated in the command register to the accumulator and cancel multiplicand register.

This main command is composed of the sub-commands $LSp$, $Ad$, $Md \rightarrow 0$.

The sub-command $Md-0$ results in the cancellation of the $Md$ register.

2nd main command

Multiply the number from the storage unit designated in the command register by the number in the accumulator.

For greater simplicity it is assumed that both numbers are given in the dual or binary system and that each comprises twenty digits. This main command requires a sub-command $Ad$?, meaning that the contents of $Md$ should be added to the accumulator only if the lowest digit in the $Mr$ register is one. Then the main command "multiplication" is composed of the following sub-commands:

$Ak \rightarrow Mr$, $LSp$, ($Ad$?, $Mr \rightarrow r$, $Md \rightarrow 1$)

($Ad$?, $Mr \rightarrow r$, $Md \rightarrow 1$) ... $Mr \rightarrow 0$, $Md \rightarrow 0$ The sub-commands in brackets are repeated twenty times so as to form and add together the partial products as is known in binary multiplication.

These examples show the main problem of the control centre which is to ensure the correct sequence of sub-commands in accordance with a main command introduced into the command register. Generally a subsequent sub-command must not be started before a previous sub-command is completed.

The problem of the invention will be further explained with reference to FIG. 2, which shows a command register 6 interconnected with a deciphering pyramid 7 for selecting one of thirty-two possible main commands H1 to H32.

The squares U1 to U20 indicate elements or units for initiating twenty sub-commands. An intermediary control 8 interconnects the deciphering pyramid 7 with the sub-command elements. After a sub-command is completed a "finish" signal is returned to the control 8 which can now initiate a subsequent sub-command. With some kinds of control arrangements the "finish" signal can be dispensed with if a sufficient time interval between initiations of consecutive sub-commands is allowed to insure that one sub-command is completed before another one is started. Various such arrangements are known. Generally they include flip-flop circuits, which may or may not be combined with switching tubes or power flip-flop circuits. These arrangements however are complicated and expensive, and the invention aims at providing an improved arrangement which is reliable yet simple and economical.

The invention uses fundamentally an arrangement as schematically indicated in FIG. 3. This arrangement provides for each one of the main commands H1, H2 . . . and so on, a chain of flip-flop circuits indicated I1 to I5 forming a chain I. Similarly circuits II1 to II5 form a chain II. The flip-flop circuits of each chain are connected to units U1 to U$n$ which serve for carrying out the sub-commands. In FIG. 3 such interconnections 9 are shown for the chain II. Leads W1 and W2 respectively are provided through which the flip-flop circuits can be operated in such manner that an operated circuit can be restored and a following circuit can be operated. If an impulse from lead H2 energises flip-flop circuit II1, an impulse is transmitted to the units U1 and U2. When these sub-commands are completed flip-flop circuit II2 is restored through lead W2 and the neighbouring circuit II2 is operated for carrying out the next sub-command U3. After completion of sub-command U3 flip-flop circuit II3 is energised for carrying out sub-command U2. After its completion flip-flop circuit II4 causes operation of the sub-command U4, and finally sub-command U1 is carried out by operation of flip-flop circuit II5. Thus the following series of operations is carried out:

U1+U2 simultaneously, U3, U2, U4, U1

A variety of consecutive connections comprising combinations including branching off, joining, looping, and repetitions with the use of a counter can thus be carried out.

Similarly, series of sub-commands, each of which may be combined with an auxiliary command if required, can be performed without difficulty.

One disadvantage of this conventional arrangement however is the complicated circuitry including a great number of components. For thirty-two main commands each comprising eight sub-commands, two hundred and fifty-six flip-flop circuits are required, and each of the latter must be designed to transmit an impulse of sufficient strength for initiating a respective sub-command. Furthermore all these impulses must be decoupled and such an arrangement is rather expensive.

It is the main object of this invention to overcome the above disadvantages.

Another object is to provide a control circuit arrangement which comprises several magneto-static chains whose number corresponds to the number of main commands. The members or links of the chains are arranged to initiate the respective sub-commands in the required sequence. It is necessary that at each instant only one of the several cores of each chain is in the magnetic condition, usually energised, as required for initiating a sub-command.

However, it is also possible to initiate with a single core of a chain several different sub-commands simultaneously. With our invention only one core, or a small number of cores, is energized at a time and the energisation of two successive cores is avoided. However, novel circuitry and patterns of operations are possible. In particular, the invention is different from conventional arrangements for storing numbers in which the various cores must be each in a magnetic condition corresponding to a respective number. Furthermore, with an arrangement according to the invention, it is possible to transmit from each member of the chain a powerful impulse, which, without further amplification, can be transmitted over long leads for the control of the respective elements of the machine. Preferably each chain of cores comprises a number of cores corresponding to the number of sub-commands included in a main command. Each core has a shifting or indexing winding, a receiving winding and a transmitting winding.

Thus a main object of the invention resides in an arrangement for controlling (in calculating machines, office machines and the like) the sequence of sub-commands as required for fulfilling main commands, comprising chains of bistable switching elements associated with the main commands, the chains being formed by windings carried upon magneto-static cores, whereby the number of chains corresponds to the number of main commands and the members of each chain are arranged for initiating the sub-commands.

According to another feature of the invention each chain can be provided with branching and joining points. Furthermore ring circuits can be formed and means can be provided to omit at volition one or more of the members of a chain, and also to operate them in repeated succession if desired.

The invention also relates to the connection and operation of the first core, in each chain which is termed a "head" core, and which has to be energised in accordance with the respective main command. Such head cores can be arranged either in a matrix pattern, in which each core carries four windings, or can form a deciphering arrangement including series connection of several branch circuits.

Other features and more details of the invention will be seen from the following description of exemplary embodiments shown in FIGS. 4–11 of the accompanying drawings.

FIG. 4 shows a core chain of linear arrangement. Each member or link of the chain comprises an annular core K1, K2, K3 . . . K$n$, which core is made of ferromagnetic material having a substantially rectangular hysteresis loop. For a high speed operation ferrites are preferred for the core material. Each core has three windings S1, G1, E1, or S2, G2, E2, and so on. The shift or indexing windings S1, S3, S5 and so on of all cores bearing an odd number of positions are connected in series, one end of the connection being grounded and the other end being connected through a lead I to the anode of a power tube 13. The cathode of the tube 13 is negative and the control grid of the tube is negative with respect to the cathode to make the tube normally non-conductive. However if a positive impulse is applied to the point 15, the tube becomes conductive for a short period whereby all the odd indexing windings S1, S3, S5 etc. are energised for the duration of the impulse. The shape of the impulse applied to the point 15 is shown in FIG. 5 by the curve denoted 15.

In a similar manner the windings positioned intermediate of the before mentioned series of windings and bearing even numbers such as S2, S4 . . . are interconnected in series relationship and are connected through a lead II to the anode of a power amplifier tube 14 having its cathode at a negative potential and a negatively biased control grid, and means are provided for applying an impulse train 16 to the control grid of the tube 14 via a point 16.

The donor windings G1, G2, G3 . . . have one end connected to a fixed potential, ground for instance, whereas the other ends which may be termed the beginnings of the windings are separately connected to terminals A1, A2, A3 through which operating impulses for the respective sub-command controlled elements of the machine can be derived.

These donor windings are connected through unidirectional devices such as tubes V1, V2, V3 or crystal diodes, with the ends of the acceptor windings E2, E3, E4 . . . of the adjacent core. The beginnings of the acceptor windings E1, E3, E5 of the cores having odd position numbers are connected through a common lead L1 to the cathodes of an amplifier tube 11. Similarly the beginnings of the acceptor windings E2, E4, E6 of the cores having an even position denomination are connected through a lead L2 to the cathode of an amplifier tube 12.

The control electrodes of the tubes 11, 12 are connected to points 16, 15 respectively.

The operation is as follows:

Assume that core K1 has been energised to cause a positive impulse at point A1. This pulse is shown by curve A1 in FIG. 5, at the time $t_0$. The remanence condition prevailing at this instant in core K1 may be termed the "1 — condition."

This impulse has no effect on core K2 since diode V1 is so poled that a positive impulse from K1 cannot be transferred to K2. If, at the instant $t_1$, (FIG. 5), an impulse 15 is applied, it causes restoring of the previous magnetic condition of core K1 by a flux changing or indexing current, and a negative impulse appears at point A1. This impulse can pass diode V1 and causes current through winding E2. Moreover the cathode of tube 12 is maintained by impulse 15 at zero voltage. The current in E2 changes the flux of K2 to the "1 — condition" of remanence and simultaneously a positive impulse is supplied from A2.

At the instant $t_2$ a positive impulse is applied to the control electrode of tubes 11 and 14 via the point 16. This impulse restores the "0 — condition" of core K2, a negative impulse appears at A2 (FIG. 5) and a coupling current flows via diode V2 to winding E3 and also via lead L1 to amplifier tube 11 so that a core flux change occurs at K3. During the change of K2 towards the "0 — condition" caused by the indexing impulse, a voltage impulse appears in winding E2 which makes the end of this winding positive with respect to its beginning. For such direction of the current diode V1 is actually conductive. However, no back current can exist since amplifier 12 is not effective while the impulse 16 lasts and the cathode can give way to a negative potential. Such a back current would be undesirable since it may change back the flux of the previous core at least partly and in any case will dissipate energy thereby reducing the indexing speed by damping.

At an instant $t_3$ another impulse 15 is applied and the sequence of operations is repeated for the cores K3 and K4. Core K3 changes its flux back to "0 — condition" and the flux in core K4 assumes "1 — condition." By alternating impulses at 15 and 16 the "1—condition" is indexed on from core to core through the whole of the chain. In this manner a very high indexing speed including for instance 300,000 cores per second can be obtained, a probable limitation being the heating up of the cores which limitation however can be overcome by suitable construction.

The diagram of FIG. 4 is given by way of example to show an important feature of the invention, residing in that only two switches need be provided. One switch closes all the coupling circuits of the donor windings of the cores of even position numbers, and including a tube and the acceptor winding of the following core. The second switch provides for closing the coupling circuits each comprising a donor winding of a core of odd position number, a tube and an acceptor winding of a following core. For indexing the "1 — condition" from an "even" core to an "odd" core, the first switch is open and the second switch is closed for the duration of an indexing impulse. Similarly, for transferring the "1 — condition" from an odd to an even core, the second switch is open and the first is closed for the duration of an indexing impulse. In this manner it is possible to step or index the "1 — condition" through a long chain of windings using two switches only.

If the indexing speed has to be high, electronic switches must be employed. Furthermore it is desirable to reduce to a minimum losses in the coupling circuits and the resistance in the closed switch must be low. This can be attained through the invention by using tubes. The acceptor windings of all the cores of odd position number (or of even position number respectively) are connected to the cathode of an amplifier tube, the control electrode of which is connected to the impulse source for the amplifier of even order number (or odd order number respectively). These impulses maintain the cathode for the time of duration of the indexing current through the even (or odd) cores at the potential of the ends of the donor windings and thereby cause closing of the switch.

In the example shown the chain of cores comprises two groups, namely, the even and the uneven core combinations, and the indexing windings of each group are connected in series. It will be understood that three or more such arrangements can be combined, in which case however, the number of switches for controlling the indexing impulses has to be increased accordingly.

As the windings on the cores can be sufficiently insulated it is not necessary that the potentials in the groups of indexing windings S1, S2 . . ., acceptor windings E1, E2 . . . and donor windings G1, G2 . . . be the same. Thus each of the tube pairs 11, 14 and 12, 13 can be replaced by single tubes the anode of which is connected to the indexing windings and cathode of which is connected to the leads L1, L2 respectively.

It is also possible to employ the same tubes 11—14 for a plurality of chains which are not otherwise associated with each other, provided that only a small number of cores have to be energised simultaneously by indexing current, so that the tubes are not overloaded by the simultaneous operation of too great a number of cores.

In FIG. 6 a variation is shown which includes parallel branches. The upper portion of the figure shows a chain including cores K1, K2 . . . K6. For the sake of simplicity none of the indexing windings S1, S2 . . . S6, but all the donor windings G1, G2 . . . G6 and acceptor windings E1, E2 . . . E6, are shown. The arrangement of unidirectional devices V1, V2 . . . V6 corresponds to that of FIG. 4. However in this modification a second unidirectional device V2' is connected to the donor winding G2 and this device supplies current to the acceptor winding E3' of a core K3'. This core is followed by cores designated K4', K5' carrying donor windings G3', G4', acceptor windings E3', E4' and indexing windings, the latter not being shown. Each donor winding is connected via a unidirectional device V3', V4' and V5' with the acceptor winding of the following core. Such an arrangement permits the coupling of core selectively K2 either to core K3 or to core K3' so that the flux of K3 or K3' is changed following the flux change of K2. Normally the cores in the upper row are consecutively indexed one after the other. However, if during the occurrence of an indexing impulse restoring core K2, lead L1' instead of lead L1 is retained at zero potential by a further amplifier (not shown), this restoring of the magnetic condition of core K2 causes change of flux direction not in core K3 but in core K3'. A positive output impulse now appears at point A3' instead of point A3. Thus the progress along the upper chain has been diverted to the lower chain. The acceptor windings of the members of the lower chain portion are now connected to leads L1, L2.

An additional amplifier associated with lead L1' can be employed in common for all the branches of a control chain even if the position of the branching point is adjacent to and after an odd core instead of an even core as shown in FIG. 6. It is only necessary to energize the additional amplifier at the instant of impulse 16 of FIG. 5 instead of at the impulse 15 and to prevent the application of impulse 16 to the amplifier 11. This is possible because the second purpose of the amplifier, namely obstructing undesirable back current, is fulfilled thereby. It is only necessary that the beginning of an acceptor winding of a core which at this instant is being restored by flux changing current through the indexing winding, be connected to a lead not retained at zero voltage.

FIG. 7 shows two sub-chains branched off at points near each other. The second sub-chain is branched off the first sub-chain which is associated with the additional lead L1', and a further additional lead L2' is provided for the second sub-chain, since lead L1' cannot be used for the second change, namely from K3' to K4".

In many cases however the second lead L2' can be dispensed with if the second sub-chain is diverted from the main chain comprising cores K3, K4, K5. Then no separate lead would be required for changing from K3 to K4". However if sub-chains are branched off from other sub-chains this simplfiication is not possible.

FIG. 6 also shows the joining of chains. For this purpose a diode V5' connects the acceptor winding of core K6 with the donor winding G5 and the donor winding G5'. No change is required in the leads to the amplifiers. Both transfers from one to the other chain however must be such that the respective points are in similar positional relationship, that is, the change must be from an even to an odd position and vice versa respectively. In a similar manner more than two chains can be joined together.

By means of branching and rejoining it is possible to form chains or chain portions of ring shape. Such an embodiment is exemplified in FIG. 8, the connection of which is substantially similar to that of FIG. 6. Depending upon whether an amplifier associated with lead L1, or an amplifier associated with lead L1' is connected, cores K3, or K3' follow the core K2. If the path includes core K3 the "1—condition" is indexed on to core K6. The donor winding G6 of this core is connected via V6 and V6' to the acceptor windings E3 and E3'. Thus the series 5, 6, 3, 4 . . . 5, 6, 3, 4 is repeated in succession until operation is changed from L1 to L1'. If, during restoring of core K6, L1' is made effective, this series is changed so that cores K3', K4', K5' follow the cores K5, K6. This connection makes it possible to omit or skip the portion K3–K6, or to re-circulate it in ring fashion for a desired number of times as determined by the use of a counter for instance. After such a series of repetition the path can be diverted to the core K3'.

The ring chain described has an even number of cores. However it is also possible if required to perform an odd number of sub-commands by the use of an additional core which initiates via a delaying element a flux changing impulse for a following core. Branching out of a closed ring need not be performed at the beginning of such a ring as shown but may be at any point of the ring.

A further possibility of leaving out a portion of a chain is shown in FIG. 9. In this figure a core K5, instead of core K3, may be operated following the core K2, if during the period of restoring core K2 lead L1' is made effective instead of lead L1. Core K5 carries a second acceptor winding E5' which is connected via a rectifier V2'.

The elementary connections shown here can be combined to realize all kinds of connection patterns and loops of magnetostatic chains. For the whole system only three amplifiers are required, the third amplifier serving for the branch portions. In some cases a fourth amplifier is required for a second additional lead L2 as shown in FIG. 7.

The demand upon the amplifiers 13, 14 supplying the flux changing currents depends of course upon the size and number of the cores. Even if cores of substantial size are used which afford an output of about one watt, a single eight watt pentode may supply up to sixty flux changing indexing windings connected in series and an indexing speed of 180,000 cores per second can be attained.

Two examples will now be given for methods of magnetising the first core K1 of each chain. FIG. 10 illustrates the first method in which these first or head cores are arranged in a matrix, and FIG. 11 shows another possibility according to which the head cores are connected to the output of a deciphering system employing ferrite cores.

FIG. 10 shows a matrix having nine elements. Each element comprises an annular core Kaa, Kab . . . Kac". All the cores may be of the same dimension as the cores of the chain. Core Kaa corresponds to the core K1 of FIG. 4, core Kaa' corresponds to the first core in the second chain, and so on. Each core carries four windings, namely a shifting winding Saa, Sab and so on, a donor winding Gaa, Gab and so on, a winding Ma, Mb associated with the respective (horizontal) line of the matrix, and another winding Na, Nb . . . corresponding to the associated (vertical) column of the matrix. The shift and donor windings correspond to the indexing and donor windings of the normal chains as shown for instance in FIG. 4. The windings Ma, Mb and Na, Nb are of small dimension. The operation of the matrix is as follows. A pre-deciphering device of a design known in the art and suitable switching tubes are provided for applying negative impulses to a selected one of the leads Ha, Hb connected each to a matrix line, and to a selected one of the leads Ha', Hb' connected each to a column of the matrix. These impulses are not sufficiently strong for energising the cores by themselves. Therefore only the core whose "line" and "column" windings are energised simultaneously changes flux due to the resultant effect of both windings. Therefore one core only corresponds to a selected line lead and a selected column lead. These cores form the first or head cores of the command chains. If after flux change of a core in the matrix a negative impulse is applied to the lead I which may correspond to the lead I of FIG. 4, the respective core is restored to its previous magnetic condition whereby a negative impulse appears at the beginning of donor winding G, which pulse is applied via a diode to the acceptor winding of core K2 of the respective chain as described before. The size of the matrix is not limited and the number of lines may differ from the number of columns of the matrix.

This arrangement has the advantage that the command decipher unit need not supply n leads for n chains. In the case of a square matrix as shown for instance it is possible to use a simple pre-deciphering system having $2 \cdot \sqrt{n}$ leads.

According to FIG. 11 a decipher unit having annular cores is used, and is controlled in accordance with the core of the command.

For the arrangement according to FIG. 11 cores of the same type as in the normal chains and carrying similar windings can be used. The decipher unit is composed of a number of series connected branch chains. It has eight outlets, each connected to a chain for performing sub-commands. It is controlled by a three digit command code in binary or dual form. The unit has four columns designated a, b, c, d including Cores Ka in the 1st column; Kb1, Kb2 in the 2nd column; Kc1, Kc2, Kc3, Kc4 in the 3rd column and so on, and it will be seen that the number of cores in each column is double compared with that of the preceding column. The transfer or shifting winding Sa on core Ka is connected in series with the transfer or shifting windings Sa1 . . . Sa4 of cores Kc1 . . . Kc4, and is connected via lead I, corresponding to lead I of FIG. 4, to the anode of valve 13. Similarly the shift windings of the cores Kb1, Kb2 and Kd1 . . . Kd8 are in series relationship and are connected to the lead II.

The donor windings Ga, Gb1, Gb2, Gc1 . . . Gc4 are connected each through a diode to the ends of acceptor windings Eb1, Eb2 and so on to two cores of the following column. The beginnings of these acceptor windings are alternately connected to two different leads namely L1, L1' and L2, L2' for each column. In order to simplify the drawing the beginning of each acceptor winding is denoted with the reference character of the respective lead and the leads are not shown. These leads are connected to four amplifiers of which two namely 11 and 12 are shown in FIG. 4.

The operation is as follows. Assume that at the beginning of the deciphering operation core K$a$ is subjected to flux change by a suitable current impulse applied to its acceptor winding. If a negative impulse is now applied to lead I, one of the two cores K$b$1, K$b$2 undergoes a flux change. Which of the two cores is operated by the current impulse induced by the flux change in K$a$ depends upon whether the amplifier of lead L2 or of lead L2' is switched on simultaneously with the said shifting impulse whereby the respective lead is maintained at zero voltage. This operation is controlled by the first digit of the command code. If for instance for number "one" at this digit the amplifier of lead L2' is switched on, then the restoring flux change of core K$a$ causes flux change of core K$b$2. In the case of a zero at this digit the amplifier of lead L2 would have been switched on for changing the flux of core K$b$1. Assume core K$b$2 has undergone a flux change, and a shifting current impulse appears then at lead II. If the second digit of the command code comprises a zero, the amplifier of lead L1 is switched on simultaneously with the impulse on lead II, and the flux of core K$c$3 is changed. At a further impulse on lead L1, and provided the third digit of the command code comprises a "one," the amplifier of lead L2' is switched on and flux change occurs in core K$d$6. Obviously more columns could be arranged to follow. The leads L1, L1', L2, L2' can serve as leads of the command chains and branch chains, if the amplifier is suitably controlled.

An arrangement as illustrated in FIG. 10 is particularly suitable if the digits of the command code appear simultaneously in parallel whereas the arrangement according to FIG. 11 is preferable for series operation. For the second arrangement almost double as many cores are required as compared with the matrix arrangement. The power demand however does not depend upon the size of the decipher unit and the number of outlets.

The examples of FIGS. 4 to 11 refer substantially to the control of a calculating system operating in accordance with the parallel principle. The magnetostatic chains however could also be used with advantage for controlling a system operating in accordance with the series principle.

With a parallel machine sub-commands may comprise a single impulse which may cause for instance shifting the number from one register to another register. Such an impulse can be derived from the chain. The impulses used with a series machine comprise direct current periods beginning and ending at predetermined instances.

With series machines the elements U1–U5 of FIG. 3 comprise units which, controlled by impulses derived from the chain, supply direct current periods of predetermined duration. Such a unit may be formed for instance by a monostable flip-flop arrangement or a bistable flip-flop arrangement which is controlled by directing impulses at regular intervals. If such units are employed a series machine can be controlled by means of an arrangement according to the invention. The end of each sub-command, in the present case the end of a voltage period, supplies the shift impulse for the chain and thereby initiates the beginning of the following sub-command.

In case the end of one sub-command and beginning of the following sub-command do not coincide, certain precautions are necessary. If the sub-commands overlap in time it is possible to initiate, simultaneously with the beginning of the first one, another sub-command, which only serves to provide a delay until the next sub-command for the operation of the calculating mechanism, can start. If there is an interval between two sub-commands such interval can be bridged by an auxiliary command which is released by the preceding sub-command. Since the required delays are usually of the same duration a small number of such auxiliary sub-commands will suffice.

Each series machine includes a "clock," which is required for controlling the start and end of each direct current impulse correlated to the sub-commands. For this purpose ring counters are frequently used comprising a flip-flop arrangement for each step, or binary arrangements can be employed which however require additional and complicated arrangements for integrating the values of various steps.

According to the invention simple chains can be used with advantage for this purpose. In such chains the donor winding of the last member supplies the acceptor winding of the first member, if the first and last members are interconnected as indicated by a dash line in FIG. 4. Such an arrangement combines the simple operating qualities of a ring counter with the simple construction of magneto-static chains. The magnetic condition required for starting the machine can be provided by a fourth winding on one of the cores of the chain.

While preferred forms of the invention have been shown and described, many more modifications will be obvious to the expert, and we wish to cover also by the appended claims all such modifications which are within the true spirit and scope of our invention.

What we claim as new and desire to secure by Letters Patent of the United States is:

1. A shift register comprising a chain of bistable switching elements, each such element comprising a magneto-static core, each core carrying an indexing winding, an acceptor winding, and a donor winding, the indexing winding of cores whose positions in the chan are identified respectively by odd and even numbers being connected together in first and second series groups, the end of each donor winding being connected by a diode to the end of the acceptor winding of the following core, the beginning of all donor windings being connected together, the beginnings of the acceptor windings of the cores having odd position numbers being connected through a common lead to the connected beginnings of the donor windings, a switch in said lead, the beginnings of the acceptor windings of the cores having even position numbers being connected through a second lead to the connected beginnings of the donor windings, a second switch in said second lead, and means for alternatively closing said switches to selectively pass coupling current from one of said cores of said first group to one of said cores of said second group and from one of said cores of said second group to one of said cores of said first group respectively.

2. A shift register comprising a chain of bistable switching elements, each such element comprising a magneto-static core, each core carrying an indexing winding, an acceptor winding and a donor winding, one terminal of each donor winding being connected to one terminal of the acceptor winding of the following core through a diode and the other terminal of all of the donor windings being connected to a common point, the indexing winding of cores whose positions in the chain are identified respectively by odd and even numbers being connected together in first and second series groups, the other terminals of the acceptor windings of the cores having odd position numbers being connected to said common point through a first lead, a first switch in said lead, the other terminals of the acceptor windings of the cores having even position numbers being connected to said common point through a second lead, a second switch in said second lead, and means for alternatively closing said switches, said chain including a branching point, at least two acceptor windings connected at the branching point to a single donor winding, and a third switch connecting the other terminal of one of the two acceptor windings to the said common point.

3. A shift register comprising a chain of bistable switching elements, each such element comprising a magnetostatic core, each core carrying an indexing winding, an acceptor winding, and a donor winding, the end of each donor winding being connected to the end of the acceptor winding of a following core through a diode, the beginnings of all of the donor windings being connected to a common point, the indexing winding of cores whose positions in the chain are identified respectively by odd and even numbers being connected together in first and second series groups, the beginnings of the acceptor windings of the cores having odd position numbers being connected through a common lead to said common point, a switch in said lead, the beginnings of the acceptor windings of the cores having even position numbers being connected through a second lead to said common point, a second switch in said second lead, and means for alternatively closing said switches, said chain including a branching point at which the acceptor windings of two cores are connected to the donor winding of a preceding core.

4. A shift register comprising a chain of bistable switching elements, each such element comprising a magnetostatic core, each core carrying an indexing winding, an acceptor winding and a donor winding, the end of each donor winding being connected to the end of the acceptor winding of a following core through a diode, the beginnings of all of the donor windings being connected to a common point, the indexing winding of cores whose positions in the chain are identified respectively by odd and even numbers being connected together in first and second series groups, the beginnings of the acceptor windings of the cores having odd position numbers being connected through a common lead to said common point, a switch in said lead, the beginnings of the acceptor windings of the cores having even position numbers being connected through a second lead to said common point, a second switch in said second lead, and means for alternatively closing said switches, said chain including a branching point at which the acceptor windings of two cores are connected to the donor winding of a preceding core, a joining point at which the acceptor winding of a core in one branch is connected to the donor winding of a preceding core of the same branch, and also, through a diode, to the donor winding of a preceding core of the other branch, the position number of one of said preceding cores being even if the position number of the other preceding core is even and odd if the position number of the other preceding core is odd.

References Cited in the file of this patent

UNITED STATES PATENTS

| | | |
|---|---|---|
| 2,403,561 | Smith | July 9, 1946 |
| 2,486,491 | Meacham | Nov. 1, 1949 |
| 2,586,409 | White | Feb. 19, 1952 |
| 2,591,406 | Carter | Apr. 1, 1952 |
| 2,673,337 | Avery | Mar. 23, 1954 |
| 2,683,819 | Rey | July 13, 1954 |
| 2,708,722 | Wang | May 17, 1955 |
| 2,736,880 | Forrester | Feb. 28, 1956 |
| 2,754,430 | Isborn | July 10, 1956 |
| 2,784,390 | Kun | Mar. 5, 1957 |
| 2,851,675 | Paivinen | Sept. 9, 1958 |
| 2,886,799 | Crooks | May 12, 1959 |
| 2,887,675 | Lo | May 19, 1959 |

FOREIGN PATENTS

| | | |
|---|---|---|
| 709,407 | Great Britain | May 26, 1954 |

OTHER REFERENCES

Minnick: "Magnetic Switching Circuits," 25 Journal of Applied Physics, No. 4, April 1954, pp. 479 to 485.

Auerbach et al.: "Magnetic Elements in Arithmetic and Control Circuits," Electrical Engineering, September 1955, pp. 766–770.

Michle: "BINAG Circuits for Digital Data-Processing Systems," IRE Convention Record, Part 4, 1955, pp. 70–83.